United States Patent Office 2,746,966
Patented May 22, 1956

2,746,966

ESTERS OF BIS-(N-SUBSTITUTED-3-HYDROXY-PIPERIDINIUM) ALKANES

John H. Biel, Milwaukee, Wis., assignor to Lakeside Laboratories, Inc., a corporation of Wisconsin No Drawing. Application November 2, 1953,
Serial No. 389,851

6 Claims. (Cl. 260—294.3)

This invention relates to esters of bis-(N-substituted-3-hydroxypiperidinium) alkanes.

I have discovered and synthesized a group of new and superior therapeutic compounds, particularly useful in producing ganglionic blockade and hypotension. The new compounds of this invention may be designated generally the esters of bis-(N-substituted-3-hydroxypiperidinium) alkanes, having the following structural formula:

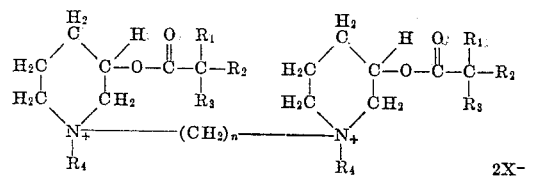

wherein $n$ is an integer of from about 2 to 10; $R_1$ is hydrogen, hydroxyl, or a lower alkyl radical; $R_2$ is hydrogen, lower alkyl or a monocyclic aryl radical; $R_3$ is hydrogen, lower alkyl, monocyclic aryl or a 2-thienyl radical; $R_4$ is an alkyl or an aralkyl radical; and X is the negative ion of a non-toxic acid. By a non-toxic acid I mean one that is non-toxic when taken in therapeutic dosages.

The compounds of this invention are in the form of quaternary ammonium salts which are generally soluble in water. Examples of the salts which may be prepared include halide, sulfate, phosphate, tartrate, benzoate, acetate, citrate, cinnamate, mandelate, maleate, succinate, and the like.

Examples of the new compounds and their preparation are as follows:

Example I

Bis-1,5-(N-ethyl-3-diphenylacetoxypiperidinium)-pentane dibromide:

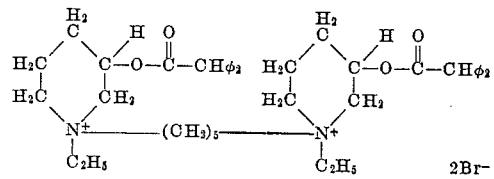

to 24.4 g. (.075 mole) N-ethyl-3-piperidyl diphenylacetate was added 8.7 g. (0.038 mole) of pentamethylene dibromide in 75 cc. of isopropyl alcohol. The solution was allowed to stand at room temperature for 5 days and then heated in citrate bottle at 70° C. for 8 hours. The mixture was concentrated to dryness in vacuo and the residue suspended in anhydrous ether. On rubbing under fresh ether the gummy mass crystallized, yield 19 g. (100%), M. P. 74° C. dec.

Anal.—Calcd. for $C_{47}H_{60}Br_2N_2O_4$: Br, 18.25; N, 3.19. Found: Br, 18.25; N, 3.05.

Example II

Bis-1,5-(N-ethyl-3-benziloxy piperidinium)-pentane dibromide:

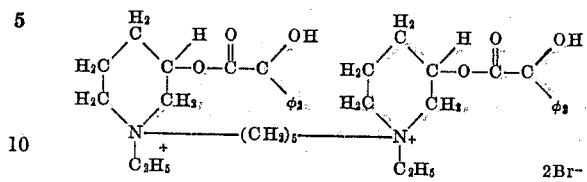

An aqueous solution of N-ethyl-3-benziloxypiperidine hydrochloride was neutralized with potassium carbonate, extracted with ether and the ether extract dried with potassium carbonate. The ether was removed by distillation, the residue dissolved in 75 cc. isopropyl alcohol and 5.7 g. (0.025 mole) of pentamethyl dibromide added. The solution was heated in a citrate bottle at 70° C. for 24 hours. The reaction mixture was concentrated to dryness and the residue then crystallized from ether. The yellow precipitate was dried in vacuo, yield 6 g. (23%); M. P. 90° C. dec.

Anal.—Calcd. for $C_{47}H_{60}Br_2N_2O_6$: Br, 17.62. Found: Br, 17.75.

Other examples have the following structural formulae:

A. Bis-1,5-(N-2'-phenethyl-3-acetoxypiperidinum)-pentane dibromide:

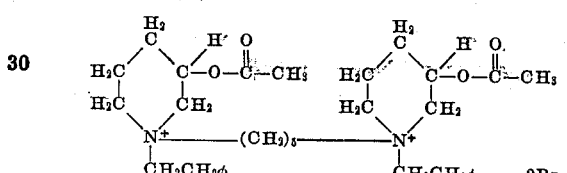

B. Bis-1,6-(N-methyl-3-trimethylacetoxypiperidinium)-hexane dibromide:

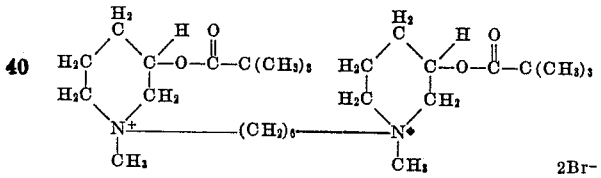

C. Bis-1,10-(N-methyl-3-phenyl-2'-thienylacetoxypiperidinium)-decane dibromide:

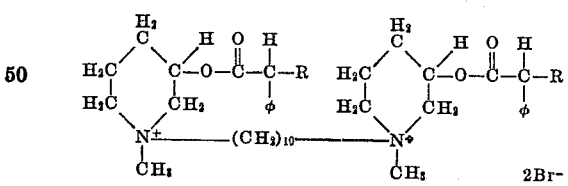

where R was

D. Bis-1,5-(N-ethyl-3-phenyl-2'-thienylhydroxyacetoxypiperidinium)-pentane dibromide:

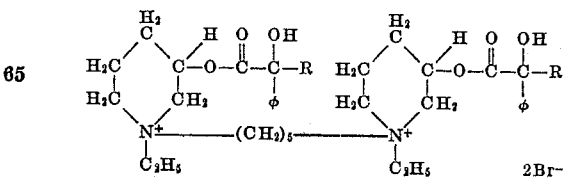

where R was

E. Bis - 1,5 - (N-n-hexyl -3 - dimethylhydroxyacetoxypiperidinium)-pentane dibromide:

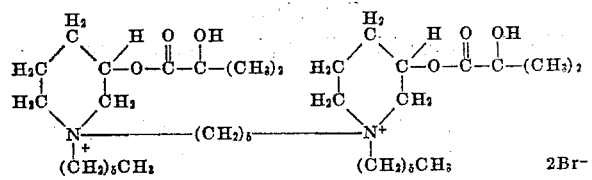

F. Bis-1,2-(N-n-trimethylacetoxypiperidinium) ethane dibromide:

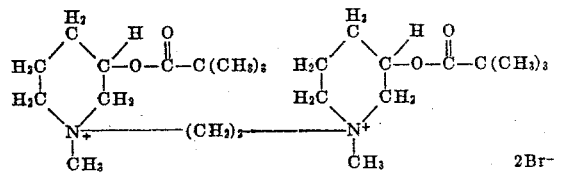

The foregoing detailed description has been given for clearness of understanding only and no unnecessary limitations should be understood therefrom as modifications will be obvious to those skilled in the art.

I claim:

1. A member of the group of compounds of the formula:

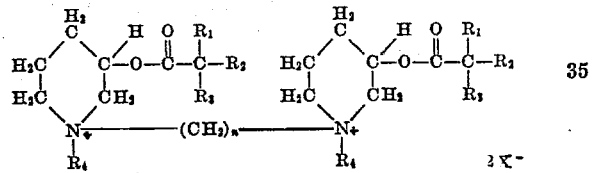

wherein $n$ is an integer from 2 to 10; $R_1$ is a member of the class consisting of hydrogen, hydroxyl and lower alkyl radicals; $R_2$ is a member of the class consisting of hydrogen, lower alkyl and monocyclic aryl radicals; $R_3$ is a member of the class consisting of hydrogen, lower alkyl, monocyclic aryl and 2-thienyl radicals; $R_4$ is a member of the class consisting of lower alkyl and aralkyl radicals in which the aryl group is monocyclic and the alkyl group of the aralkyl radical is a lower alkyl; and X is the negative ion of a nontoxic acid.

2. The composition of claim 1 wherein $R_1$ is hydroxyl, $R_2$ and $R_3$ are phenyl, $R_4$ is ethyl, $n$ is 5 and X is bromide.

3. The composition of claim 1 wherein $R_1$, $R_2$, and $R_3$ are hydrogen, $R_4$ is phenylethyl, $n$ is 5 and X is bromide.

4. The composition of claim 1 wherein $R_1$, $R_2$, $R_3$ and $R_4$ are methyl, $n$ is 6, and X is bromide.

5. The composition of claim 1 wherein $R_1$ is hydroxyl, $R_2$ is phenyl, $R_3$ is 2-thienyl, $R_4$ is ethyl, $n$ is 5, and X is bromide.

6. The composition of claim 1 wherein $R_1$ is hydrogen, $R_2$ and $R_3$ are phenyl, $R_4$ is ethyl, $n$ is 5, and X is bromide.

References Cited in the file of this patent

UNITED STATES PATENTS

| | | |
|---|---|---|
| 2,477,937 | Paul et al. | Aug. 2, 1949 |
| 2,533,003 | Feldkamp | Dec. 5, 1950 |

OTHER REFERENCES

Paul: Compt. rend. (Fr. Acad. Sci.), vol. 221, pp. 412–4 (1945).

Chen et al.: Chem. Abst., vol. 46, col. 6263 (1952).